United States Patent
Bae

(10) Patent No.: US 11,364,862 B2
(45) Date of Patent: Jun. 21, 2022

(54) SHOCK ABSORPTION BUMPER AND MANUFACTURING METHOD THEREOF

(71) Applicants: HYUNDAI MOTOR COMPANY, Seoul (KR); KIA MOTORS CORPORATION, Seoul (KR)

(72) Inventor: Chul Hong Bae, Suwon-si (KR)

(73) Assignees: HYUNDAI MOTOR COMPANY, Seoul (KR); KIA MOTORS CORPORATION, Seoul (KR)

(*) Notice: Subject to any disclaimer, the term of this patent is extended or adjusted under 35 U.S.C. 154(b) by 457 days.

(21) Appl. No.: 16/600,782

(22) Filed: Oct. 14, 2019

(65) Prior Publication Data
US 2020/0391684 A1    Dec. 17, 2020

(30) Foreign Application Priority Data
Jun. 12, 2019    (KR) .......................... 10-2019-0069190

(51) Int. Cl.
| | |
|---|---|
| *B60R 19/03* | (2006.01) |
| *B29C 45/14* | (2006.01) |
| *B29C 45/00* | (2006.01) |
| *B22D 17/00* | (2006.01) |
| *B29L 31/30* | (2006.01) |
| *B29K 509/08* | (2006.01) |
| *B29K 705/02* | (2006.01) |

(52) U.S. Cl.
CPC .............. *B60R 19/03* (2013.01); *B22D 17/00* (2013.01); *B29C 45/0005* (2013.01); *B29C 45/14795* (2013.01); *B29K 2509/08* (2013.01); *B29K 2705/02* (2013.01); *B29L 2031/3044* (2013.01)

(58) Field of Classification Search
CPC ......... B60R 19/03; B60R 19/02; B22D 17/00; B22D 18/02; B29C 45/0005; B29C 45/14795; B29C 45/14631; B29C 2045/14803; B29C 45/14008; B29C 45/1418; B29C 45/14; B29K 2509/08; B29K 2705/02; B29K 2101/12; B29K 2477/00; B29K 2507/04; B29L 2031/3044
USPC ......................................................... 293/121
See application file for complete search history.

(56) References Cited

U.S. PATENT DOCUMENTS 9,193,892 B2 *  11/2015  Yano ........................ C08L 33/08
9,382,601 B2 *   7/2016  Lee ......................... C22B 21/064
(Continued)

FOREIGN PATENT DOCUMENTS

| CN | 104711447 A | * | 6/2015 | ......... C22B 21/0084 |
| CN | 109535548 A | * | 3/2019 | ............. C08J 5/044 |

(Continued)

*Primary Examiner* — Pinel E Romain
(74) *Attorney, Agent, or Firm* — Lempia Summerfield Katz LLC

(57) ABSTRACT

A method of manufacturing a bumper for impact absorption and a bumper for the impact absorption manufactured from the same are provided. The method includes: filling solid salts in a mold, injecting a molten metal into the mold, and solidifying the molten metal with the solid salts to obtain a solidified product, spraying water onto the solidified product to dissolve the solid salts, which results in obtaining a porous metal having pores, disposing the porous metal in an injection mold, and injecting-inserting a resin composite into the injection mold to surround the porous metal while filling at least a part of the pores in the porous metal.

15 Claims, 1 Drawing Sheet

(56) References Cited

U.S. PATENT DOCUMENTS

| | | | |
|---|---|---|---|
| 9,630,579 B2 | 4/2017 | Park et al. | |
| 2014/0377466 A1* | 12/2014 | Tielemans | C09D 5/027 |
| | | | 427/379 |
| 2016/0272136 A1 | 9/2016 | Park et al. | |
| 2020/0262182 A1* | 8/2020 | Tullis | B32B 27/32 |
| 2021/0016549 A1* | 1/2021 | Fujioka | B32B 7/08 |

FOREIGN PATENT DOCUMENTS

| | | |
|---|---|---|
| JP | 2005-247165 A | 9/2005 |
| KR | 10-2007-0080911 A | 8/2007 |
| KR | 10-2009-0029937 A | 3/2009 |
| KR | 10-2013-0052208 A | 5/2013 |
| KR | 10-1683511 A1 | 12/2016 |

* cited by examiner

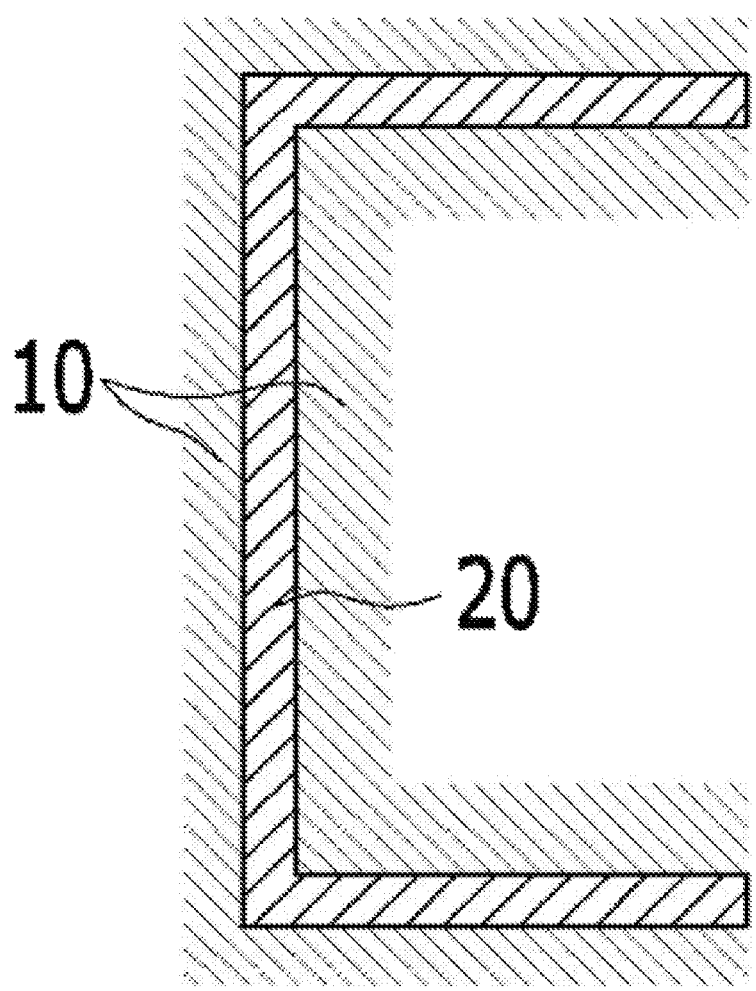

SHOCK ABSORPTION BUMPER AND MANUFACTURING METHOD THEREOF

CROSS-REFERENCE TO RELATED APPLICATION

This application claims priority to and the benefit of Korean Patent Application No. 10-2019-69190, filed on Jun. 12, 2019, the entire contents of which are incorporated herein by reference.

FIELD

The present disclosure relates to a bumper to increase impact energy absorbing efficiency, and a method of manufacturing the same.

BACKGROUND

The statements in this section merely provide background information related to the present disclosure and may not constitute prior art.

In general, when a vehicle collides with an external object, a bumper of the vehicle serves to primarily absorb impact energy to prevent damage to main parts such as an engine and a transmission and to prevent injury of a vehicle occupant. Generally, a front of the vehicle is equipped with a steel bumper and a rear thereof is equipped with a bumper made of a resin composite such as Glass fiber Mat reinforced Thermoplastic (GMT) to reduce a weight of the vehicle. In particular, the resin composite such as the GMT used in a rear bumper of the vehicle is 20 to 25% lighter than iron and has a steel-like strength, thereby being used to be substituted for steel. In addition, because the resin composite is capable of being molded by injection molding, the resin composite has high degree of freedom in design to be applied to various automobile parts such as a seat as well as the bumper.

In detail, Korean Patent No. 1,683,511 (Patent Document 1) discloses a glass fiber mat reinforced plastic composite material and a bumper back beam including a carbon fiber reinforced plastic composite material which is staked in the glass fiber mat reinforced plastic composite material. However, the resin composite such as the GMT is a plastic material and has brittle nature due to properties of glass fibers or carbon fibers, which are added in reinforced phases. As a result, the bumper made of the resin composite has a limit in thickness to be thicker than the conventional steel bumper for having an impact absorbing rate similar to that of the conventional steel bumper. In addition, the bumper made of the resin composite has a limitation that it is difficult to apply to the front bumper having a relatively high degree of severity.

Meanwhile, a method of applying foamed metal as a bumper of a vehicle has been proposed for lightening a weight of the vehicle. Specifically, Korean Laid-Open Patent No. 2013-0052208 (Patent Document 2) discloses a method of manufacturing an open-type porous metal including preparing a metal basic material; preparing a mixed mold which is not reactive with the metal basic material; preparing a spherical salt made of a nonmetallic salt; dissolving the metal basic material; injecting a molten metal and the spherical salt into a mold; cooling the mold and separating the metal material from the cooled mold; and removing the spherical salt of the separated metal material. The manufacturing method disclosed in Patent Document 2 has a limitation in that a removal rate of the spherical salt is low and mass production is difficult because the metal material is immersed in lukewarm water to dissolve and remove the spherical salt.

SUMMARY

An aspect of the present disclosure provides a bumper for a vehicle to absorb impact forces with a lighter weight than a conventional steel bumper and to increase impact energy absorbing efficiency to be applicable to a front bumper, and a method of manufacturing the same.

According to an aspect of the present disclosure, a method of manufacturing a bumper for impact absorption includes filling solid salts in a mold, injecting a molten metal into the mold, and solidifying the molten metal with the solid salts to obtain a solidified product, spraying water onto the solidified product to dissolve the solid salts, which results in obtaining a porous metal having pores, disposing the porous metal in an injection mold, and injecting-inserting a resin composite into the injection mold to surround the porous metal while filling at least a part of the pores in the porous metal.

In addition, according to an aspect of the present disclosure, a bumper for impact absorption includes a porous metal and a resin composite, wherein the resin composite surrounds the porous metal while filling at least a part of pores in the porous metal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 1 is a cross-sectional view of a bumper for impact absorption according one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, the present disclosure will be described in detail.

Method of Manufacturing Bumper for Impact Absorption

A method of manufacturing a bumper for impact absorption according to the present disclosure includes a first operation of filling solid salts in a mold, injecting a molten metal into the mold, and solidifying the molten metal with the solid salts to obtain a solidified product, a second operation of spraying water onto the solidified product to dissolve the solid salts, which results in obtaining a porous metal having pores, a third operation of disposing the porous metal in an injection mold, and a fourth operation of injecting-inserting a resin composite into the injection mold to surround the porous metal while filling at least a part of the pores in the porous metal.

First Operation

In the first operation, the mold is filled with the solid salts and the molten metal is injected into the mold and the molten metal with the solid salts are solidified to obtain the solidified product. Here, the molten metal may be injected into the mold to fill the gaps between solid salts to be solidified.

The solid salts are not particularly limited as long as they are solid salts having water solubility. For example, the solid salts may include at least one selected from the group consisting of KCl, NaCl, $K_2NO_3$, $Na_2CO_3$, $CaCl_2$, and $MgCl_2$. Specifically, the solid salts may include salt.

In addition, each of the solid salts may have a particle shape and may have an average diameter ($D_{50}$) of 1 to 10 mm. Specifically, an average diameter ($D_{50}$) of the solid salts is 2 to 8 mm, 3 to 7 mm, or 4 to 6 mm. When the average diameter of the solid salts is less than 1 mm, the porous metal to be produced has a porosity of 20% or less and a density of 1.3 g/cm³ or more not to be suitable for lightening a weight of the vehicle. Also, a diameter of each pore of the porous metal to be produced is so small that the injected resin composite is not capable of flowing into the porous metal and thus it is difficult to increase impact absorbing efficiency through a binding between the porous metal and the resin composite. When the average diameter of the solid salts is 10 mm or more, the diameter of each pore of the porous metal to be produced becomes too large to reduce the impact absorbing efficiency of the bumper to be produced and to generate flow vortexes in the gaps upon injection of the resin composite, thereby having a difficulty in flowability of the resin composite.

Further, the average diameter ($D_{50}$) of the solid salts may be controlled using a sieve.

Furthermore, in the first operation, the solid salts may fill the mold and the mold may be shaken to improve a packing ratio of the solid salts in the mold. Here, the mold filled with the solid salts may be shaken and the solid salts may move to increase or maximize the packing ratio of the solid salts.

In addition, the molten metal may include at least one metal selected from the group consisting of aluminum, silicon, magnesium, iron, nickel and manganese. Specifically, the molten metal may include aluminum.

Furthermore, the molten metal may be obtained by dissolving the above-mentioned metal at 650 to 750° C. or 670 to 720° C.

In addition, in the first operation, when the molten metal is injected into the mold, the molten metal may be filled with the gap between the solid salts by gravity. Here, injection may be performed under compression or decompression to have a pressure of 0.5 to 0.9 bar or 1.2 to 2.0 bar. When depressurized or pressurized to the above-described pressure upon the injection, there is an effect that the fine gap between the solid salts or a fine gap between the solid salts and the mold may be filled with the molten metal.

In addition, solidification may be carried out at room temperature, specifically, at a temperature of 20 to 25° C. Here, solidification time is not particularly limited.

Furthermore, the solidified product may be a form in which the solid salts are dispersed in the metal.

Second Operation

In the second operation, the water is sprayed onto the solidified product to dissolve the solid salts, thereby obtaining the porous metal having the pores. As described above, when the porous metal is produced using the solid salts and water, an average diameter of the pores in the porous metal may be easily adjusted to the average diameter of solid salts. A chemical foaming process, which is a conventional method for producing a porous metal, uses a foamer or a thickener such as $TiH_2$, $MgH_2$, or CaO. The foamer or thickener as described above remains on a surface of the porous metal to fall off or crumbling from the surface of the metal. Meanwhile, because the porous metal produced by the method according to the present disclosure does not include the chemical foaming process, there is no problem of crumbling or falling off a compound, which remains on the surface of the porous metal.

Here, in the second operation, the water at 80 to 100° C. may be sprayed at 20 to 100 bar. Specifically, in the second operation, the water at 80 to 95° C. may be sprayed at 30 to 80 bar or 40 to 60 bar.

In addition, in the second operation, the water may be sprayed while the solidified product is shaken. Here, the water may dissolve the solid salts to form the porous metal with the pores, each which has an open cell type. In the porous metal, the solid salts may dissolve to leave only the metal. That is, the porous metal may be the metal having the pores, each which has the open cell type.

In addition, the porosity of the porous metal may be 20 to 60%. Specifically, the porosity of the porous metal may be 30 to 60% or 35 to 50%. When the porosity of the porous metal is 20% or less, the density of the porous metal is 1.3 g/cm³ or more not to be suitable for lightening the weight of the vehicle. Furthermore, when the porosity of the porous metal is 60% or more, energy absorbing rate of the porous metal to be produced may be lowered, collision absorption characteristics desired for the bumper may be unsatisfactory, and therefore it may be difficult to be applied to a front bumper.

Furthermore, the porous metal may have a density of 1.1 to 1.3 g/cm³. Specifically, the porous metal may have a density of 1.2 to 1.3 g/cm³. When the density of the porous metal is within the above range, the density is similar to a density of the conventional GMT to be good for lightening the weight of the vehicle.

Third Operation

In the third operation, the porous metal is disposed in the injection mold.

The porous metal may be cut to a size suitable for a size of the injection mold before being placed in the injection mold. Here, cutting may be applied without any particular limitation as long as it is a method of cutting the porous metal.

Fourth Operation

In the fourth operation, the resin composite is injected to be inserted into the injection mold to surround the porous metal while filling at least a part of the pores in the porous metal.

Here, the resin composite may include 50 to 90 parts by weight of a thermoplastic polymer and 10 to 50 parts by weight of a filler. Specifically, the resin composite may include 50 to 80 parts by weight or 50 to 70 parts by weight of the thermoplastic polymer and 20 to 50 parts by weight or 30 to 50 parts by weight of the filler. When amounts of the thermoplastic polymer and the filler in the resin composite are within the above range, a problem in which the bumper to be produced has insufficient tensile strength to be difficult to be applied to the front bumper and a problem in which a binding force between the thermoplastic polymer and the filler is decreased to be difficult to be produced in a bumper shape may be prevented.

In addition, the thermoplastic polymer may be at least one selected from the group consisting of polyamide, polypropylene, polyethylene, polyethyleneterephthalate, polyacetate, and acrylonitrile-butadiene-styrene. Specifically, the thermoplastic polymer may include polypropylene.

Furthermore, the filler may include at least one selected from the group consisting of glass fiber, carbon fiber and aramid fiber. Specifically, the filler may be glass fiber.

In addition, the filler may have a diameter of 1 to 100 μm and a length of 1 to 10 mm. Specifically, the filler may have a diameter of 5 to 80 μm or 10 to 30 μm and a length of 1 to 8 mm or 2 to 5 mm.

In the method of manufacturing the bumper for impact absorption according to the present disclosure as described above, the porous metal is manufactured using the low-priced solid salts and the water to improve economic efficiency of the bumper to be produced due to a low manufacturing cost. Furthermore, in the above-described manufacturing method, a size of each pore of the porous metal may be adjusted by controlling the diameter of each solid salts and strength of the produced porous metal may be excellent because the foaming by the chemical reaction is not performed.

Bumper for Impact Absorption

The bumper for impact absorption according to the present disclosure may include the porous metal; and the resin composite, wherein the resin composite surrounds the porous metal while filling at least a part of the pores in the porous metal.

Referring to FIG. 1, the bumper 100 for the impact absorption may include a porous metal 20 and a resin composite 10 surrounding the porous metal 20.

Here, the porous metal may have the porosity of 20 to 60% and the density of 1.1 to 1.3 g/cm$^3$. Specifically, the porous metal may have the porosity of 30 to 60% or 35 to 50% and a density of 1.2 to 1.3 g/cm$^3$.

Further, the resin composite may include the thermoplastic polymer and the filler. Specifically, the resin composite may include 50 to 90 parts by weight of the thermoplastic resin and 10 to 50 parts by weight of the filler.

In addition, the thermoplastic polymer may include at least one selected from the group consisting of polyamide, polypropylene, polyethylene, polyethyleneterephthalate, polyacetate, and acrylonitrile-butadiene-styrene.

The filler may include at least one selected from the group consisting of glass fiber, carbon fiber, and aramid fiber.

Furthermore, the bumper for the impact absorption may include 30 to 60% by area of the porous metal and 40 to 70% by area of the resin composite based on a total area of a cross section of the bumper. Specifically, the bumper for the impact absorption may include the porous metal of 50 to 60% by area and the resin composite of 40 to 50% by area based on the total area of the cross section of the bumper. When the area of the porous metal is within the above range, a maximum load and an energy absorbing efficiency target value which are the bumper desired characteristics may be satisfied.

In addition, the bumper for the impact absorption may have the energy absorbing rate of 37% or more, 37 to 50%, or 40 to 50%.

Furthermore, the bumper for the impact absorption may have the maximum load of 23 kN or more, 23 to 30 kN, or 25 to 30 kN.

The bumper for impact absorption according to the present disclosure as described above is lighter in weight than a conventional steel bumper, which is advantageous for the lightening the weight of the vehicle and is excellent in impact energy absorbing efficiency to be applied to the front bumper.

Hereinafter, the present disclosure will be described more specifically through examples. However, these examples are provided only for the understanding of the present disclosure, and the scope of the present disclosure is not limited to these examples in any sense.

EXAMPLE

Example 1. Production of Bumper 1-1: Production of Porous Metal

Salt particles having an average diameter ($D_{50}$) of 5 mm as the solid salts were placed in a mold, and a molten aluminum of 700±20° C. was injected into the mold to fill gaps between the salt particles and gaps between the salt particles and the mold with the molten aluminum. Thereafter, a solidified product where the salt particles are dispersed in the metal was obtained by solidification. Then, while the solidified product was shaken, water at 90±5° C. was sprayed at a high pressure of 50 bar to dissolve the salt particles, thereby obtaining the porous metal having the pores, each which has the open cell type. The obtained porous metal had a density of 1.25 g/cm$^3$, a porosity of 40%, and an average thickness of about 150 mm.

1-2: Production of Bumper

After the porous metal produced in Example 1-1 was placed in an injection mold, a resin composite (glass fiber of 4060 wt % wt % (average diameter: 30 μm, average length: 3.5 mm) and polypropylene of 60 wt % (weight average molecular weight: 55 g/mol)) was injected to be inserted in the injection mold, to manufacture the bumper for shock absorption. The obtained bumper had a shape in which the resin composite is filled a part of pores in the porous metal.

Comparative Example 1

After 900 g of aluminum as a raw material, 30 g of sodium as a thickener, 40 g of ZrH$_2$ as a foamer and 30 g of cobalt were mixed, a mixture was put into a mold. Thereafter, the mold was cured, melted, and foamed at 700° C. and then, is cooled to room temperature. Thereafter, the mold was removed to produce foamed aluminum.

Test Example 1. Measurement of Physical Properties of Bumper

The maximum load and the energy absorbing rate of the bumper manufactured in Example 1 and Comparative Example 1 were measured, and results are shown in Table 1.

Specifically, the maximum load and the energy absorbing rate were measured using a method similar to a vehicle condition test, which is a high-speed drop impact test through a load measuring sensor.

TABLE 1

| | | Maximum Load(Kn) | Energy Absorbing rate(%) |
|---|---|---|---|
| Example 1 | #1 | 26.5 | 42.7 |
| | #2 | 28.9 | 46.4 |
| | #3 | 28.5 | 46.8 |
| | Average | 27.9 | 45.3 |
| Comparative Example 1 | #1 | 21.8 | 32.3 |
| | #2 | 23.2 | 39.4 |
| | #3 | 22.7 | 36.7 |
| | Average | 22.6 | 36.1 |

As shown in Table 1, it was found that the bumper of Example 1 was significantly superior to the bumper of Comparative Example 1 in terms of the maximum load and the energy absorbing rate.

The bumper for the impact absorption according to the present disclosure is lighter in the weight than the conventional steel bumper, which is advantageous for lightening the weight of the vehicle and is excellent in impact energy absorbing efficiency to be applicable to the front bumper.

In addition, in the method of manufacturing the bumper for the impact absorption according to the present disclosure, the porous metal is manufactured using the low-priced solid salts and water to improve the economic efficiency. Furthermore, in the manufacturing method, the size of each gap in the porous metal may be easily adjusted by controlling the diameter of each solid salt and the porous metal produced without the foaming by the chemical reaction is excellent in the strength.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure.

What is claimed is:

1. A method of manufacturing a bumper for impact absorption, the method comprising:
    filling solid salts in a mold, injecting a molten metal into the mold, and solidifying the molten metal with the solid salts to obtain a solidified product;
    spraying water onto the solidified product to dissolve the solid salts, which results in obtaining a porous metal having pores;
    disposing the porous metal in an injection mold; and
    injecting-inserting a resin composite into the injection mold to surround the porous metal while filling at least a part of the pores in the porous metal.

2. The method of claim 1, wherein each of the solid salts includes at least one selected from the group consisting of KCl, NaCl, $K_2NO_3$, $Na_2CO_3$, $CaCl_2$, and $MgCl_2$.

3. The method of claim 1, wherein each of the solid salts has a particle shape and has an average diameter ($D_{50}$) of 1 mm to 10 mm.

4. The method of claim 1, wherein the solidified product is a form in which the solid salts are dispersed in the metal.

5. The method of claim 1, wherein injecting the molten metal into the mold is carried out under compression or decompression to have a pressure of 0.5 to 0.9 bar or 1.2 to 2.0 bar.

6. The method of claim 1, wherein the porous metal has a porosity of 20 to 60%.

7. The method of claim 1, wherein in spraying the water, the water of 80 to 100° C. is sprayed at 20 to 100 bar.

8. The method of claim 1, wherein the resin composite includes 50 to 90 parts by weight of a thermoplastic polymer and 10 to 50 parts by weight of a filler.

9. The method of claim 8, wherein the thermoplastic polymer includes at least one selected from the group consisting of polyamide, polypropylene, polyethylene, polyethyleneterephthalate, polyacetate, and acrylonitrile-butadiene-styrene, and
    wherein the filler includes at least one selected from the group consisting of glass fiber, carbon fiber and aramid fiber.

10. A bumper for impact absorption comprising:
    a porous metal; and
    a resin composite,
    wherein the resin composite surrounds the porous metal while filling at least a part of pores in the porous metal.

11. The bumper for the impact absorption of claim 10, wherein the porous metal has a porosity of 20 to 60% and a density of 1.1 to 1.3 g/cm$^3$.

12. The bumper for the impact absorption of claim 10, wherein the resin composite includes a thermoplastic polymer and a filler.

13. The bumper for the impact absorption of claim 12, wherein the thermoplastic polymer is at least one selected from the group consisting of polyamide, polypropylene, polyethylene, polyethyleneterephthalate, polyacetate, and acrylonitrile-butadiene-styrene.

14. The bumper for the impact absorption of claim 12, wherein the filler includes at least one selected from the group consisting of glass fiber, carbon fiber, and aramid fiber.

15. The bumper for the impact absorption of claim 12, wherein the resin composite includes 50 to 90 parts by weight of the thermoplastic polymer and 10 to 50 parts by weight of the filler.

* * * * *